United States Patent [19]

Burgdorf et al.

[11] Patent Number: 5,350,226
[45] Date of Patent: Sep. 27, 1994

[54] ANTI-LOCK HYDRAULIC BRAKE SYSTEM

[75] Inventors: Jochen Burgdorf, Offenbach-Rumpenheim; Hans-Dieter Reinartz, Frankfurt am Main; Helmut Steffes, Hattersheim; Norbert Ocvirk, Offenbach; Peter Volz, Darmstadt; Lutz Weise, Mainz; Helmut Fennel, Bad Soden; Hans Wupper, Friedrichsdorf; Hans-Wilhelm Bleckmann, Nauheim; Erhard Beck, Weilburg; Dieter Dinkel, Eppstein/Ts; Karlheinz Haupt, Gau-Algesheim, all of Fed. Rep. of Germany

[73] Assignee: Alfred Teves GmbH, Frankfurt am Main, Fed. Rep. of Germany

[21] Appl. No.: 809,498

[22] PCT Filed: Jun. 1, 1990

[86] PCT No.: PCT/EP90/00874

§ 371 Date: Dec. 10, 1991

§ 102(e) Date: Dec. 10, 1991

[87] PCT Pub. No.: WO90/15738

PCT Pub. Date: Dec. 27, 1990

[30] Foreign Application Priority Data

Jun. 17, 1989 [DE] Fed. Rep. of Germany ....... 3919842
Oct. 6, 1989 [DE] Fed. Rep. of Germany ....... 3933396
Nov. 23, 1989 [DE] Fed. Rep. of Germany ....... 3938734

[51] Int. Cl.⁵ .............................................. B60T 13/18
[52] U.S. Cl. .................................. 303/116.2; 303/900
[58] Field of Search ................. 303/10, 11, 900, 113.1, 303/113.2, 116.1, 116.2, 117.1

[56] References Cited

U.S. PATENT DOCUMENTS

| | | | |
|---|---|---|---|
| 3,767,271 | 10/1973 | Grosseau | 303/117.1 |
| 3,829,166 | 8/1974 | von Loewis et al. | 303/97 |
| 3,837,712 | 9/1974 | Grosseau | 303/117.1 |
| 4,099,793 | 7/1978 | Iio | 303/116.4 |
| 4,919,495 | 4/1990 | Kircher et al. | 303/900 X |
| 5,002,344 | 3/1991 | Hashida | 303/117.1 |
| 5,002,345 | 3/1991 | Becker | 303/900 X |
| 5,176,432 | 1/1993 | Burgdorf et al. | 303/900 X |

FOREIGN PATENT DOCUMENTS

| | | |
|---|---|---|
| 0253157 | 1/1988 | European Pat. Off. . |
| 1453663 | 3/1969 | Fed. Rep. of Germany . |
| 1938708 | 2/1970 | Fed. Rep. of Germany . |
| 2030385 | 1/1971 | Fed. Rep. of Germany . |
| 3505410 | 8/1986 | Fed. Rep. of Germany . |
| 3734903 | 5/1989 | Fed. Rep. of Germany . |
| 3739915 | 8/1989 | Fed. Rep. of Germany . |
| 3936697 | 5/1990 | Fed. Rep. of Germany . |
| 2145560 | 2/1973 | France . |
| 2176105 | 10/1973 | France . |
| 88350 | 3/1990 | Japan ............................. 303/11 |
| 1511164 | 9/1989 | U.S.S.R. ......................... 303/11 |
| 2101245 | 1/1983 | United Kingdom . |
| 2186647 | 8/1987 | United Kingdom . |
| 2244316 | 11/1991 | United Kingdom ............. 303/900 |

*Primary Examiner*—Robert J. Oberleitner
*Assistant Examiner*—Alfred Muratori
*Attorney, Agent, or Firm*—Robert P. Seitter; J. Gordon Lewis

[57] ABSTRACT

An anti-lock hydraulic brake system is described wherein a throttle valve has a restrictive flow condition which becomes effective in the brake line in the event of brake slip control. Pumps for reapply pressure deliver fluid to the wheel brake via this restriction and regulating the pressure in the wheel brake is performed by control of an outlet valve. The throttle valve is operated hydraulically by various arrangements including the application of pump pressure, or by wheel brake pressure applied upon opening of the outlet valve at the start of an anti-lock control cycle.

28 Claims, 9 Drawing Sheets

ANTI-LOCK HYDRAULIC BRAKE SYSTEM

BACKGROUND OF THE INVENTION

The present invention relates to an anti-lock hydraulic brake system using a throttling valve which normally is open but which restricts flow to the brake line upon initiation of antilock control.

A like brake system is known from U.S. patent specification 3,829,166.

Herein an electromagnetically actuated valve operated by means of a control electronics is provided as a throttle valve. The valve is open in its initial position and releases the brake line. In the energized position, the cross-section of the brake line will be restricted so that the pressure fluid flow is throttled.

GB 21 01 245 A describes a brake system of the same type wherein the throttle valve is operated hydraulically. The pressure in the pressure fluid collecting means acts as switching pressure, the collecting means being designed as a low-pressure accumulator in this system.

It is the shortcoming of the brake system disclosed in the above U.S. patent that the electronic unit necessitates an expensive solenoid valve and additional drive modules.

The brake system according to the GB application inheres the disadvantage that the hydraulic valve is operated with delay only. Hence it is not safeguarded that rapid pressure reduction may take place.

The present invention has for its object to provide an anti-lock hydraulic brake system which is furnished with only a small number of electromagnetically actuated valves and which, in addition, safeguards a rapid pressure reduction.

SUMMARY OF THE INVENTION

This object is achieved by the means associated with the throttle valve to cause a switching to the restricted flow condition in response to development of a pressure increase in the wheel brake.

This feature effects that the pressure at the outlet of the pump switches the throttle valve over, the master brake cylinder being closed vis-a-vis the control line through a non-return valve.

To be able in case of need to quickly decrease the pressure in the wheel brake irrespective of throttling by the throttle valve, a non-return valve is connected in parallel to the throttle valve and opens towards the master cylinder. When the pressure in the master cylinder is decreased, the pressure reduction is supplied further to the wheel brake via the non-return valve past the throttle valve.

In a simple manner, the inventive idea can be combined with a so-called open loop brake system. 'Open' brake system implies that the pressure-fluid collecting means is a supply reservoir which is open to the atmosphere and which communicates with the working chamber of the master brake cylinder in the master brake cylinder's non-actuated condition.

A permanent coupling between the pump piston and its eccentric permits pressure fluid to be supplied instantaneously upon the commencement of a brake slip control operation, without the need to first exhaust pressure fluid from a wheel brake.

Furthermore, the present invention can be extended easily so as to be able to also limit traction slip by virtue of the proposed brake system. To this end, the brake lines must be closable so that the pressure fluid supplied by the pumps during a traction slip control operation cannot escape via the master brake cylinder.

In a dual-circuit brake system, wherein in one circuit both the brakes of driven and non-driven wheels are comprised, the branch line of the brake line leading to the driven wheels must branch off upstream of the closing valve.

It is particularly expedient to provide for a switching member comprising an actuating rod on which a first separating piston is designed. The latter separates the housing into two chambers, with a pressure in the switching chamber switching the throttle valve into a second switch position, while a pressure in the resetting chamber causes the throttle valve to assume the first switch position.

In the event that the resetting chamber communicates with the wheel brake in an unthrottled fashion and the switching chamber connects to the wheel brake via a throttle, the following effect will result:

When the pressure in the wheel brake is reduced suddenly due to opening of the outlet valve, the pressure variation in the resetting cheer becomes effective at once, while it becomes effective in the switching chamber only with delay because of the throttle. Resulting therefrom is a pressure gradient on the separating piston which switches the throttle valve into the second switch position.

To safeguard that the throttle valve remains in the second switch position during a control operation, the pump pressure can be provided as further control pressure. This pump pressure retains the throttle valve in its second switch position even in the event that the pressure in the switching chamber and in the resetting chamber adapt to one another.

Another possibility of switching which guarantees a swift change-over of the throttle valve at the beginning of a control action will be described in the following.

The basic idea resides in that, with the outlet valve open, the wheel braking pressure acts upon the throttle valve and switches the throttle valve over.

Provided a corresponding inventive valve assembly, this accomplishes a surprisingly simple and functionally reliable hydraulic circuitry of the brake system which surpasses the conventional demands and enables a surprisingly simple anti-lock and traction slip control mode.

The throttle valve is devised such as to keep the passage in the main pressure line open when it is in its basic position, which latter is controllable e.g. by a spring, so that a hydraulic connection to the wheel brake is rendered possible for the purpose of brake actuation irrespective of the fluid delivery on the pump side or master cylinder side. For reasons of function and safety, the outlet valve allocated to the wheel brake is closed in its basic position in order to prevent inadvertent flow-back to the supply reservoir.

Only when the outlet valve is excited electromagnetically will it open the return flow to the supply reservoir, and the inlet valve switches over in a surprisingly simple manner by way of the return flow acting as hydraulic control flow so that the throttle valve throttles the fluid flow in the brake line and simultaneously opens the return line.

Owing to the inlet valve being designed as a controllable throttle valve, the phase in which the pressure is maintained constant during the anti-lock and traction slip control operation is enabled in good approximation to the electromagnetic inlet valve control in dependence on the clock frequency of the outlet valve in a definitely uncomplicated manner. Furthermore, the inventive hydraulic actuation of the throttle valve ensures a decelerationless switching into the restricted position, whereby the depression of the brake pedal through its full travel is prevented.

The inventive idea is to be described hereinbelow by way of several embodiments, shown in 10 FIGS., with reference to the accompanying drawings.

Figure 1:
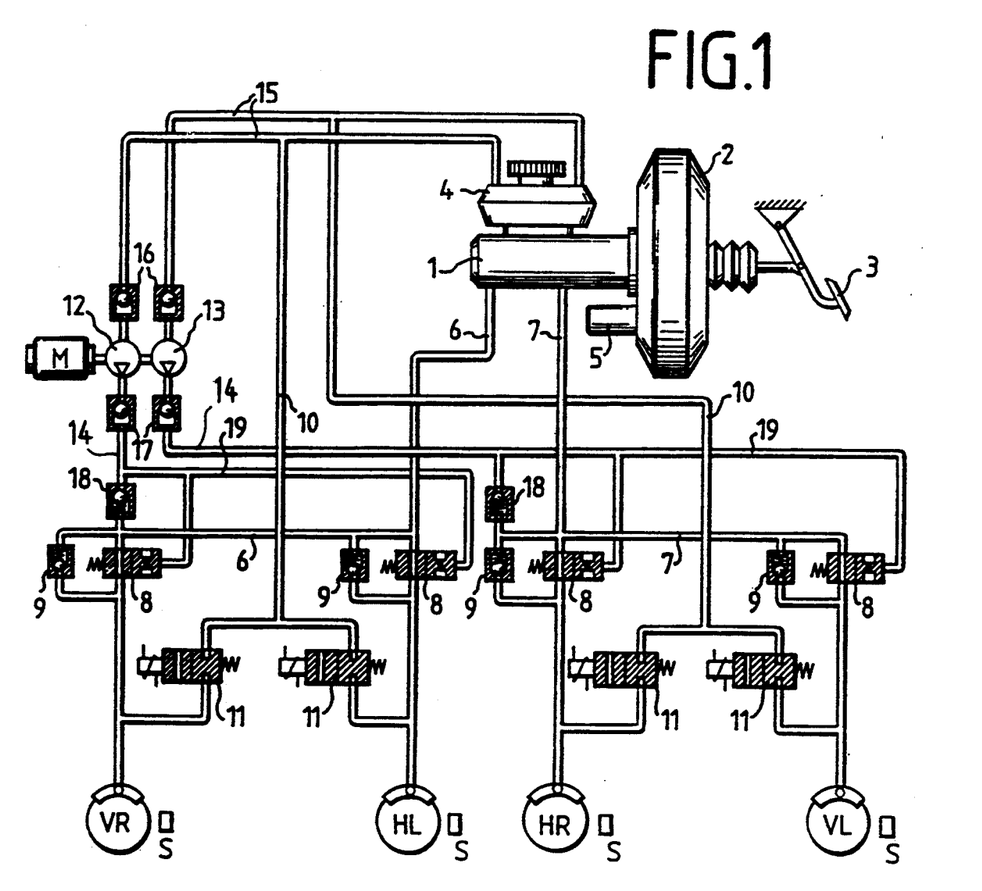
FIG. 1 is a schematic illustration of an automotive vehicle brake system according to the invention.

To begin with, FIG. 1 shall be referred to:

The brake system is composed of a master brake cylinder 1, connected upstream of which is a vacuum brake power booster 2. To operate the brake system, a pedal 3 is depressed so that the boosted pedal forces are applied to the master brake cylinder 1. Allocated to the master brake cylinder 1 is a supply reservoir 4 which is in communication with the working chambers of the master brake cylinder in a known fashion as long as the brake pedal is not operated. The braking pressure generator described herein is a conventional product having no differences compared to the state of the art.

A travel-responsive switch 5 able to determine the travel of the booster plate of the vacuum brake power booster 2 is connected to the vacuum brake power booster 2. The signals of the travel-responsive switch 5 can be made use of for controlling the pump and for positioning the pedal during a brake slip control operation.

The master brake cylinder 1 is in communication with the wheel brakes via a first brake line 6 and a second brake line 7. A first brake circuit is formed by the front right (VR) wheel brakes and the rear left wheel brakes (HL), while a second brake circuit is formed by the rear right (HR) wheel brakes and the front left (VL) wheel brakes. Inserted into each branch line of the brake lines is a throttle valve 8 having two switch conditions. In the first switch condition, there is a free unrestricted connection between the master brake cylinder 1 and the respective wheel brake. When the throttle valve switches over, the branch line of the brake line will be restricted.

Connected in parallel to the throttle valve 8 is a non-return valve 9 opening towards the master brake cylinder 1. Furthermore, each wheel brake is in communication with the supply reservoir 4 via a return line 10. The branch lines of this return line dispose each of one outlet valve outlet 11 which is operated electromagnetically. The respective branch line of the return line 10 is closed in the outlet inoperative position of the outlet valve. As soon as the actuating magnet of the outlet valve 11 is energized, the outlet valve 11 adopts its open position.

Associated with each brake line 6, 7 is a retrospective pump 12, 13. The pumps are driven by a common motor M. Their suction sides are communicating with the supply reservoir 4 via suction lines 15. Each suction line contains a suction valve 16 closing towards the supply reservoir 4. The pressure sides of the pumps are in communication with one brake line 6, 7, respectively, via a pressure line 14. A pressure valve 17 opening towards the brake line is inserted into the latter pressure line. Inserted after the pressure valve 17 is another suction valve 16, the control line 19 to the throttle valve 8 branching off between the pressure valve 17 and the suction valve 16. The suction valve 16 causes the master cylinder pressure to not become effective in the control line 19 in the event of braking without slip control. It is thereby avoided that the throttle valve 8 assumes its throttling or restricted condition during a nominal braking operation.

Allocated to the wheels are sensors "S" ascertaining the angular velocity of the wheels.

Figure 2:
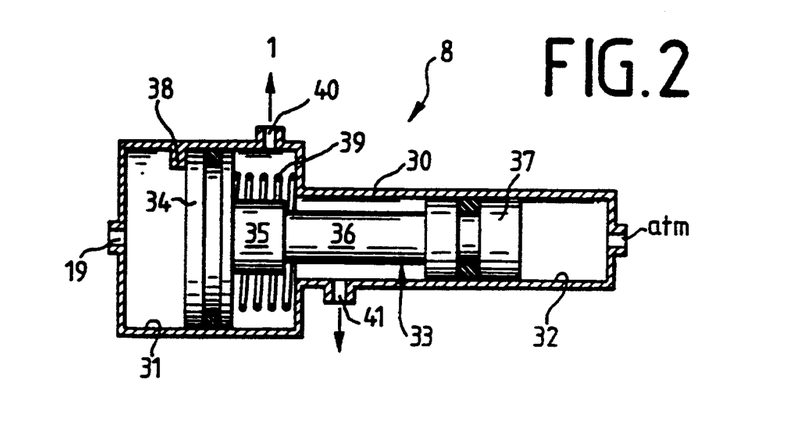
FIG. 2 is a cross-sectional view taken through an embodiment of a throttle valve used on the inventive vehicle brake system.

One possible embodiment of the throttle valve is shown in detail in FIG. 2. A stepped piston 33 is guided in a stepped bore 31, 32 in a housing 30. It is composed of four portions, one portion 34 thereof being sealingly guided in the large step 31 of the stepped bore. A second portion 37 is sealingly guided in the smaller step 32 of the stepped bore. Between the first and the second portion succeeding the first portion is a third portion 35 having a diameter which is somewhat less than the diameter of the smaller step 32 of the stepped bore. Disposed between the third and the second portion is a portion 36 whose diameter is appreciably smaller than the diameter of the smaller step 32. Piston 33 is kept in abutment on a stop 38 by a spring 39, the third portion 35 being placed still in the area of the large step 31 in the so defined position of the stepped piston 33.

A control line 19 connects to the chamber which is bounded by the first piston portion 34 and is disposed on the side opposite to the second piston portion 37. The annular chamber in the large step of the bore is connected to the master brake cylinder 1 (connection 40), whilst the annular chamber in the smaller step 32 of the stepped bore connects to a wheel brake (connection 41).

In the illustrated position of the stepped piston 33, there is an unrestricted connection between the master brake cylinder 1 and the wheel brake. As soon as pressure is applied to the control line 19, the stepped piston 33 is shifted into the smaller bore 32, to the right when viewed in the drawing. The third piston portion 35 is now disposed in the smaller step, the annular gap between the piston portion 35 and the wall of the smaller bore 32 being dimensioned such that the pressure-fluid connection between the master brake cylinder 1 and the wheel brake is restricted.

Figure 3:
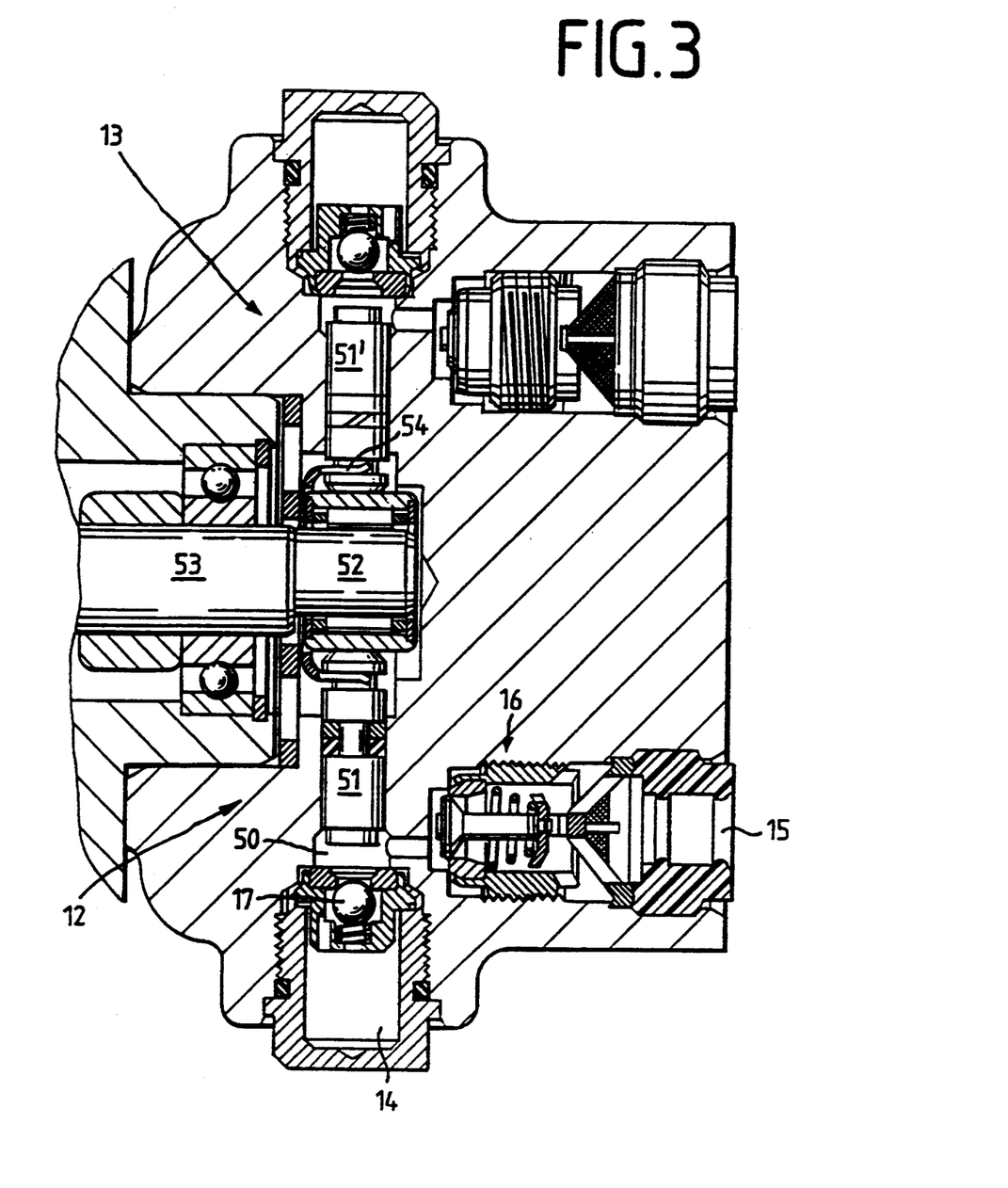
FIG. 3 is a cross-sectional view taken through an embodiment of a double-piston pump used on the inventive vehicle brake system.

A possible design form of the pump is illustrated in FIG. 3. A double-piston pump with two pump pistons 51, 51' is concerned. These pistons are driven by one common eccentric 52. The pump chamber 50 communicates via a suction valve 16 with the suction line 15 and via a pressure valve 17 with the pressure line 14.

The eccentric 52 is shaped at the drive shaft 53. It is important that the pistons 51, 51' are kept in constant abutment on the eccentric by means of a coupling ring 54 so that a forced stroke movement of the pistons 51, 51' will always be performed irrespective of the fill condition of the pump.

The brake system operates according to the following principle.

During braking without slip control, the outlet valve 11 is closed, and the throttle valve assumes the unrestricted position. Motor M is switched off. Hence there is an unrestricted connection between the master brake cylinder 1 and the respective wheel brakes. The wheel brakes can be acted upon by pressure when the pedal 3 is depressed. The control lines 19 are unpressurized, since the non-return valves 18 prevent that the master cylinder pressure becomes effective in the control lines 19.

When it is detected by the sensors that there is imminent locking at any one of the wheels, the system switches into the anti-lock or control mode. This implies that the outlet valve 11 of the imminently locking wheel is opened and voltage is applied to the motor M causing the pumps 12, 13 to start to deliver. This generates pressure at the outlet of the pump in front of the suction valve which becomes effective in the control line 19, too, and switches the throttle valve 8 over. Switch-over means that the stepped piston 33 is displaced and that a throttling effect is thus achieved. The pumps 12, 13 will now deliver fluid via the restrictor in the throttle valve 8 to the wheel brakes. When the opening cross-section of the outlet valves 11 is chosen such that more pressure fluid is discharged into the supply reservoir 4 than is delivered via the restrictor of the throttle valve 8, pressure decrease takes place in the respective wheel brake. As soon as the outlet valve is closed, pressure build-up is performed since the pressure fluid supplied by the pumps 12, 13 brings about pressure increase.

Pulsed actuation of the outlet valves 11 allows to even realise a phase in which the pressure is kept constant. The quantity of pressure fluid furnished by the pump is exactly that quantity of pressure fluid which is discharged again into the supply reservoir via the outlet valve. Pulsed actuation of the valve 11 permits also to realise various speeds of pressure increase and/or decrease.

Since merely the outlet valve 11 must be operated electromagnetically, whereas the 'inlet valve' is operated hydraulically, the expenditure in electronics needed to actuate the control valves can be reduced considerably.

When the pressure in the master cylinder is reduced during a pressure control action and, that is to say, below a value adjusted in the wheel brake, pressure fluid out of the wheel brake will flow back to the master brake cylinder 1 via the non-return valve 9. Therefore, quick pressure decrease can be effected if so desired by the driver of the vehicle in spite of the switched-on throttle valve 8.

Figure 4:
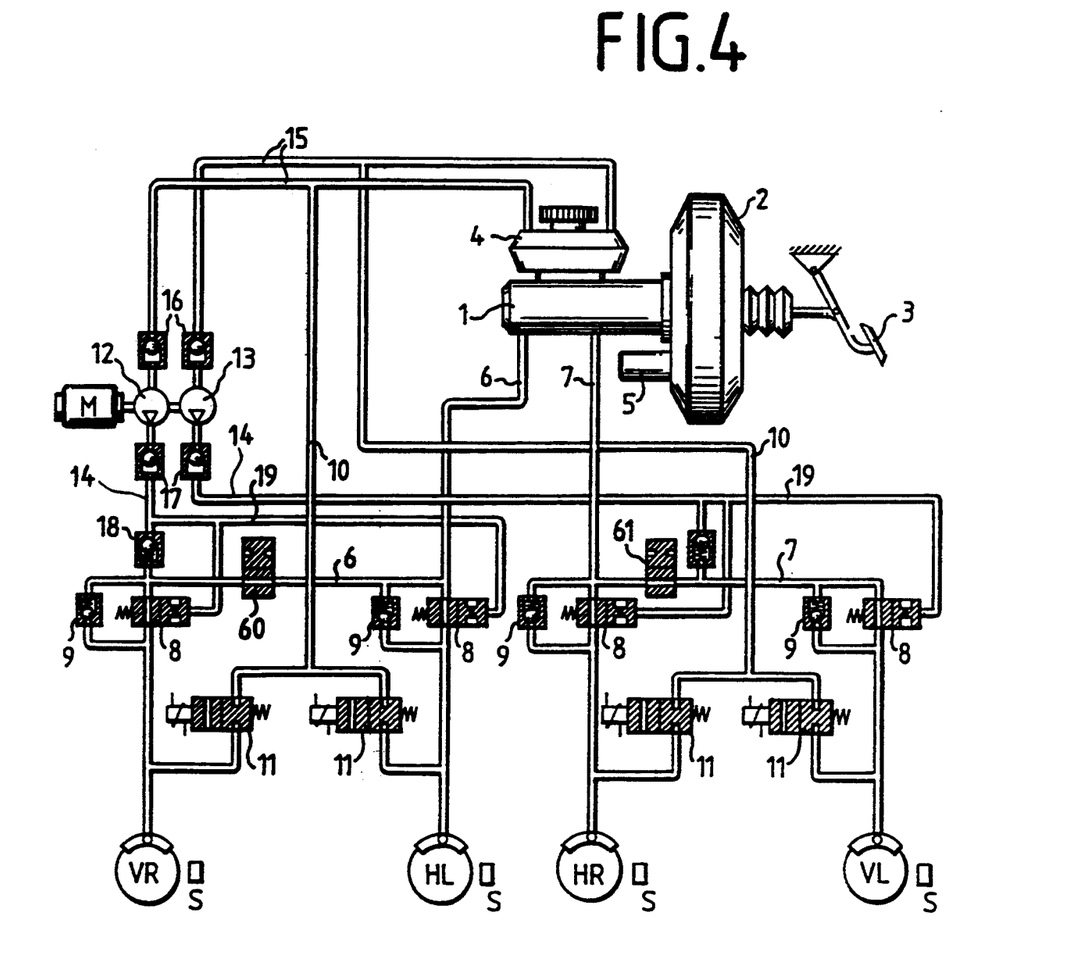
FIG. 4 is a schematic illustration of another embodiment of an automotive vehicle brake system according to the invention.

FIG. 4 shows a hydraulic circuit permitting pressure to build up in the lines 6, 7 to the wheel brakes regardless of the operation of the pedal so that a traction slip control operation can be performed. To this end, each brake line 6, 7 contains a TSC-valve 60, 61 which is operated electromagnetically. These valves are open in their inactive position and switch to their closed position when energized. It is assumed in this enrollment that the wheels of the front axle are driven. Therefore, the TSC-valves 60, 61 are inserted into the brake line such that the brake line branches leading to the non-driven wheels of the rear axle branch off between the master brake cylinder 1 and the TSC-valve 60, 61. The pressure lines 14 terminate into the brake line downstream of the TSC-valves 60, 61. In the traction slip control mode, the pumps 12, 13 are connected only to the wheel brakes of the wheels of the front axle. Opening and closing of the outlet valve 11 will now permit in the same fashion as in the event of brake slip control to adjust the pressure in the wheel brakes such that the drive moment is always in harmony with the friction ratios between road surface and tires. It is thereby avoided that the driven wheels will spin and lose their lateral guidance abilities.

Figure 5:
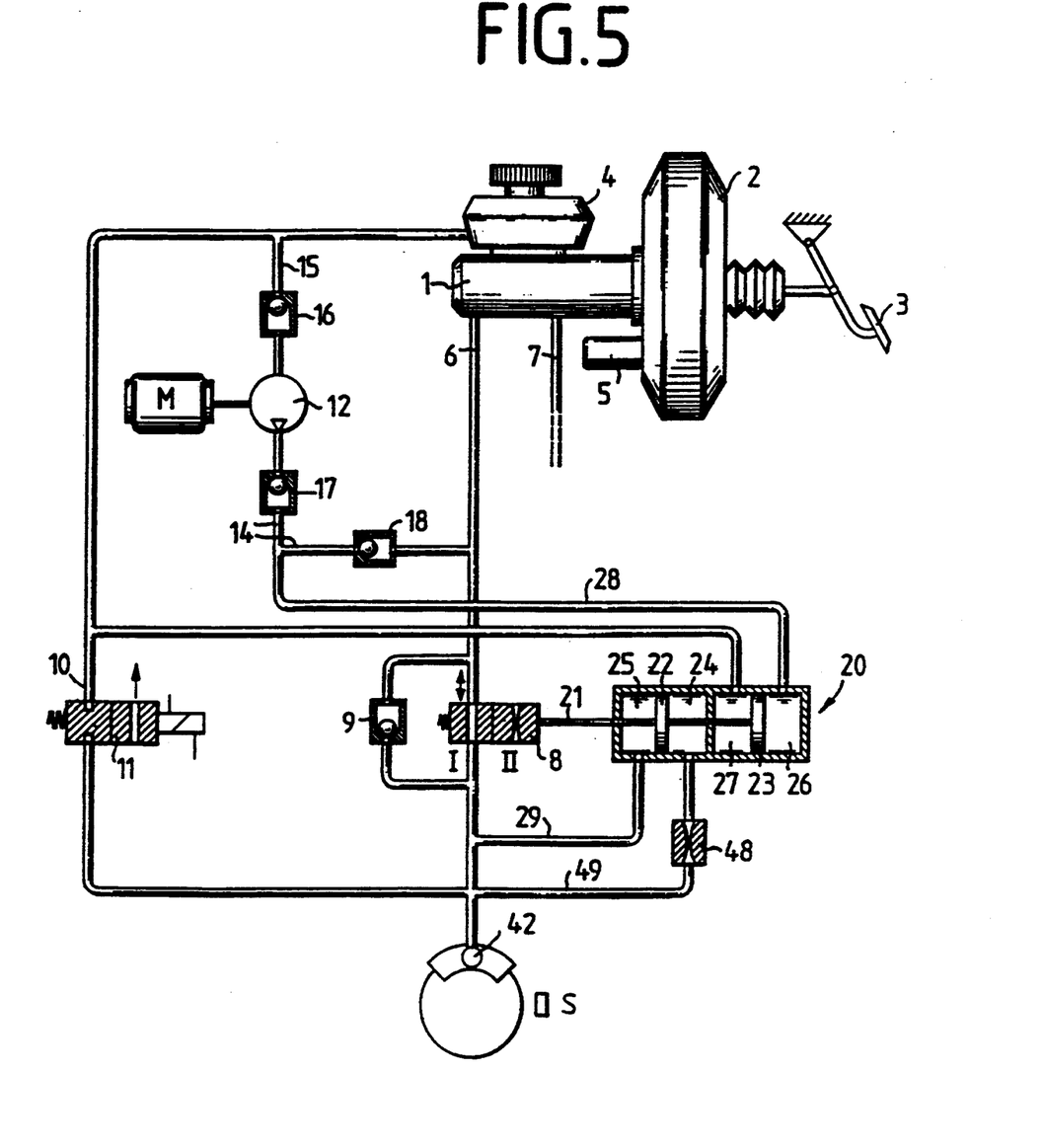
FIG. 5 is a schematic illustration of yet another embodiment of the invention in a single circuit of an automatic brake system.

FIG. 5 will be referred to in the following. Only one brake circuit with a pump 12 is illustrated. The other circuit is of corresponding design.

Allocated to the throttle valve 8A is a switching member 20 which comprises an actuating rod 21 for actuating the throttle valve 8A. A first separating piston 22 and a second separating piston 23 are shaped at and attached to the actuating rod 21. The first separating piston 22 separates two chambers, namely a first switching chamber 24 and a resetting chamber 25. The first switching chamber is defined such that a pressure in this chamber switches the throttle valve 8A from the first into the second switch position. A pressure in the resetting chamber 25 resets the throttle valve 8A from the second into the first switch position. Both chambers 24, 25 communicate via each one connecting line 29, 49 with the wheel brake 42 and/or with the brake line 6 between the throttle valve 8A and the wheel brake 42. A constant restrictor 48 is inserted into the line 49 leading to the first switching chamber 24. The second separating wall 23 also separates two chambers, the second switching chamber 26 connecting to the control line 28, while the first chamber 27 is in communication with the supply reservoir 4 and hence is always unpressurized.

The brake system operates according to the following principle. In a braking operation without control, the outlet valve 11 is closed and the throttle valve 8 is in the unrestricted position. Motor M is switched off. Hence there is an unrestricted connection between the master brake cylinder 1 and the wheel brake. The wheel brake can be acted upon by pressure when the pedal 3 is depressed. The control line 28 is not exposed to pressure, since the non-return valves 18 prevent this.

When it is detected by the sensor S that there is imminent locking at a wheel, the system switches into the anti-lock or control mode. This implies that the outlet valve 11 will be opened and voltage is applied to the motor M causing the pump 12 to start to deliver. Caused by opening of the outlet valve 11, pressure fluid discharges from the wheel brake 42 into the supply reservoir 4. Since the throttle valve has a slight throttling effect even in the first switch position, the discharge of pressure fluid causes a pressure decrease in the wheel brake. This decrease becomes effective also in the chambers 24 and 25, yet the pressure decrease in the chamber 24 takes place with delay due to the effect of the restrictor 48. A pressure gradient is caused on the first separating piston 22 which results in the separating piston 22 displacing to the left, when viewed in the drawing, and the throttle valve switching over into the second switch position II.

In the meantime, sufficient pressure has built up at the outlet of the pump 12 which becomes effective in the chamber 26 and also loads the actuating rod 21 so as to cause switching of the throttle valve 8A into the second switch position. Even if the pressure in the chambers 24 and 25 is now balanced again, the throttle valve remains in the second switch position as long as the pump 12 is delivering.

Pump 12 is now delivering fluid via the restrictor in the throttle valve 8A to the wheel brake. When the opening cross-section of the outlet valve 11 is chosen such that more pressure fluid is discharged into the supply reservoir 4 than is delivered via the restrictor of the throttle valve 8, pressure decrease takes place in the wheel brake. As soon as the outlet valve will be closed, pressure build-up is performed since the pressure fluid supplied by the pump 12 to the wheel brake brings about pressure increase.

Pulsed actuation of the outlet valves 11 allows to even realise a phase in which the pressure is kept constant. The quantity of pressure fluid furnished by the pump is exactly that quantity of pressure fluid which is discharged again into the supply reservoir via the outlet valve. Pulsed actuation of the valve 11 permits also to realise various speeds of pressure increase and/or decrease.

Since merely the outlet valve 11 must be operated electromagnetically, whereas the 'inlet valve' (throttle valve) is operated hydraulically, the expenditure in electronics needed to actuate the control valves can be reduced considerably.

When the pressure in the master cylinder is reduced during a pressure control action and, that is to say, below the value adjusted in the wheel brake, pressure fluid out of the wheel brake will flow back to the master brake cylinder 1 via the non-return valve 9. Therefore, quick pressure decrease can be effected if so desired by the driver of the vehicle in spite of the throttle valve 8 switched on.

Other arrangements for hydraulically operating the throttle valve 8 is disclosed in FIGS. 6 to 10.

Figure 6:
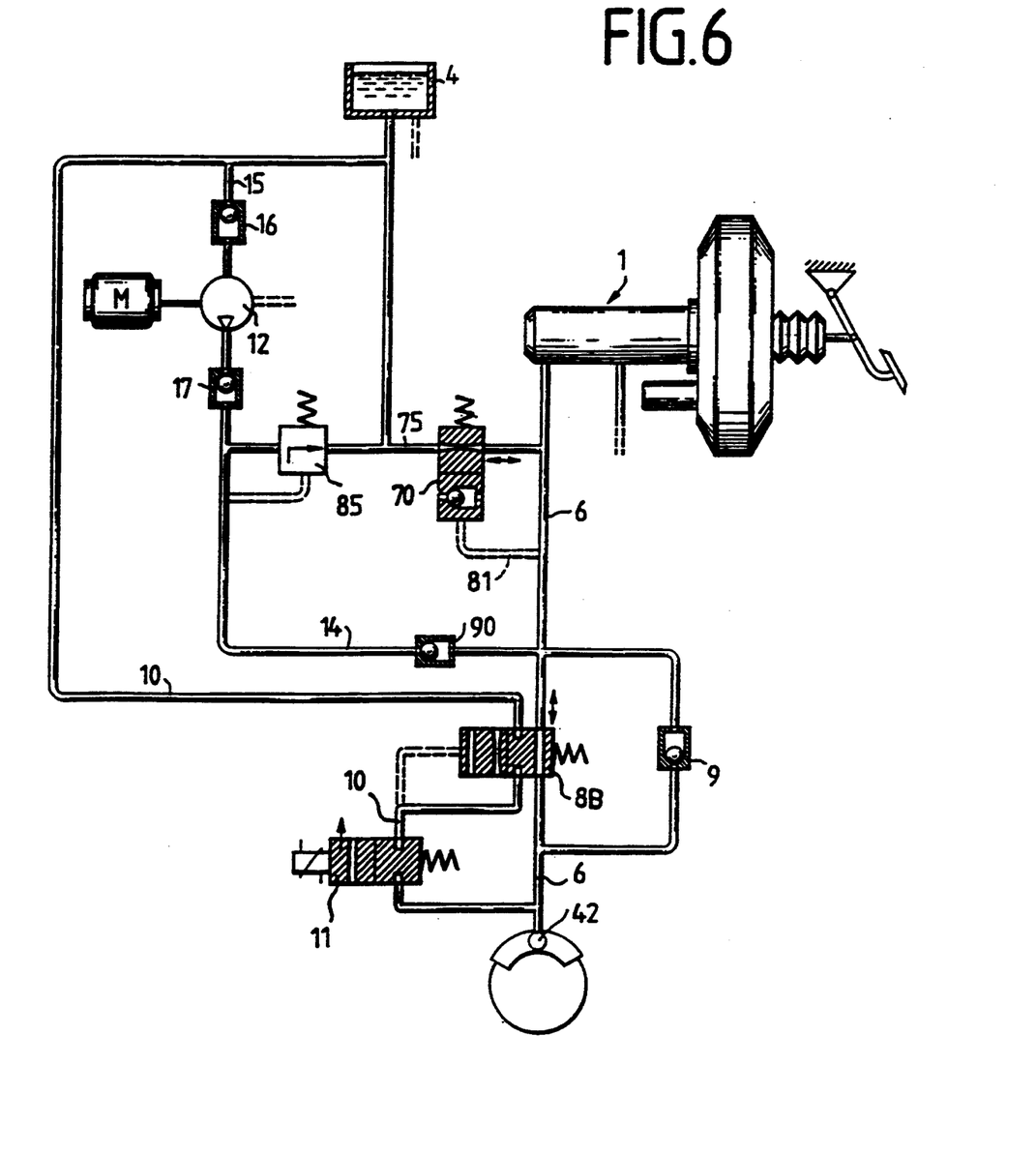
FIG. 6 is a schematic illustration of still another embodiment of the invention in a single circuit of an automotive brake system.

FIG. 6 is schematic diagram of the inventive traction-slip and/or brake-slip controlled hydraulic circuit. For the sake of improved surveyability of the illustrated brake system, solely those elements of a wheel brake have been depicted and explained which are relevant for the invention and the function.

For the pressure fluid supply of the wheel brake 42, a hydraulic connection is established between the wheel brake 42 and the unpressurized supply reservoir 4, in the line system's branch in which the master brake cylinder 1 is connected, via the four-way/two-position directional control valve which, being open in its basic position, is inserted as throttle valve 8B into the branch line and the brake line 75, 6. Another branch at the supply reservoir 4 connects the pump 12 via non-return valves 16, 17, 90 with the throttle and outlet valves 8B, 11 inserted ahead of the wheel brake 42. A branch line 75 constitutes a connection to the master brake cylinder 1 on the pressure side of the auxiliary pressure pump 12. This branch line 75 receives a pressure-limiting valve 85 controlled by the pump pressure as well as a throttle and non-return valve which is arranged separately as central valve 70 and which is driven by the master cylinder pressure.

When the brake is not applied, the pressure fluid propagates from the supply reservoir 4 via the open central valve 70 that is separately arranged in the branch line 75 and via the throttle valve 8B connected thereafter and switched to be open in its basic position to prevail at the wheel brake 42 in an unpressurized manner, while the outlet valve 11 remains closed electromagnetically in its basic position. The return line 10 branching off at the wheel brake 42 remains isolated from the pressure fluid in consequence of the closed throttle valve 8B that is designed as a four-way/two-position directional control valve as well as due to the outlet valve 11 which, in its basic position, is closed when de-energized. Temperature-responsive increases or decreases of the pressure-fluid volume in the hydraulic system will then be effected unhinderedly in the direction of the supply reservoir 4 by virtue of the previously described determined valve switch conditions.

During conventional pedal-activated braking, a pressure is backed up due to the throttling effect in the central valve 70, the said pressure as a reaction leading to the hydraulic switch-over of the central valve 70, in consequence whereof the non-return valve integrated in the central valve 70 acts to lock in the direction of the supply reservoir 4 and the pump 12. As a result of the brake line 6 being separated from the branch line 75 on the valve side, a pressure proportional to pedal force can be built up in the brake line 6 to propagate, due to the closed outlet valve 11, via the throttle valve 8B which is in its unrestricted position to the wheel brake 42. Both the return line 10 and the pump 12 coupled to the pressure line 14 remain without effect.

As soon as brake slip signals indicate the overbraking of the vehicle wheel to a slip control electronics which is not shown in more detail in the drawing, the braking pressure and/or the volume in the wheel brake 42 will be reduced in an anti-lock control action by way of the outlet valve 11 being opened in response to an electric output signal of the control electronics. The control electronics likewise causes start-up of the pump 12 in order to produce the operating pressure of roughly 140 bar. Since, depending on influences due to friction and on constructive circumstances for building up the pump pressure, a not negligible period of time of about 150 milliseconds delays the required pressure build-up, the pressure backed up at the open outlet valve 11 is used as control pressure for switching the throttle valve 8B over during pressure reduction in front of the restrictor integrated in the throttle valve 8B so that instantaneously with the opening of the outlet valve 11 the throttle valve 8B will also switch and, naively, irrespective of how fast the pump 12 starts its operation. Hence depression of the pedal through its full travel is prevented in an inventive manner, since it is not required to first hydraulically switch the open throttle valve 8B in a retarded manner to reach the restricted position in which the pressure fluid flow is almost closed, while in the meantime already, due to the pulsed outlet valve 11, pressure fluid volume would escape out of the master brake cylinder 1 into the return line 10, what could considerably increase the pedal stroke in an undesired manner.

After the throttle valve 8B has switched over hydraulically, the pressure fluid voluble introduced in the direction of the wheel brake 42 is throttled due to the restricted position of the throttle valve 8B being effective in the brake line 6, while the return line 10 is released by the outlet valve 11 and the throttle valve 8B. Rapid pressure decrease is ensured.

Pulsed or clockwise actuation of the outlet valve 11 with a defined control frequency permits to realise relatively simply even the phase in which the pressure is maintained constant as well as various pressure-increase and/or pressure-decrease speeds without having to electronically control the throttle valve 8B in a costly manner.

When the pressure in the master brake cylinder 1 is decreased below the controlled wheel braking pressure, a rapid pressure decrease in the wheel brake 42 may take place by virtue of the non-return valve 9 connected in parallel to the throttle valve 8B, since then the restricted position of the throttle valve 8B is bypassed.

The control electronics activates the pump 12 in the traction slip control mode so that due to the increase of the system pressure in the pressure and brake lines 14, 6 the central valve 70 which is arranged separately in the branch line 75 and comprises a restrictor is hydraulically closed in the position of the non-return element as a result of the effect of the pressure fluid backing up. Caused hereby, the pressure-fluid return flow to the supply reservoir 4 is interrupted so that traction slip control is effective depending on the electromagnetic actuation of the outlet valve 11 and hence also of the follow-up control of the throttle valve 8B.

Phases of pressure increase, pressure-retaining phases and pressure-decrease phases can be regulated in TSC-operation likewise by way of pulsewise operation of the outlet valve 11 as described in ABS-operation so that there is no need to use an electromagnetically driven throttle valve 8B. Therefore, change-over of the throttle valve 8B is preferably to be effected hydraulically by way of the pump pressure when the outlet valve 11 is opened, in consequence whereof the wheel braking pressure is regulated already by the restrictor control of the throttle valve 8B.

In contrast to the known traction-slip-controlled brake systems, the arrangement of a special TSC-separating valve is superfluous, since the return flow of the auxiliary pressure into the supply reservoir 4 is avoided because of the separate circuit configuration of the central valve 70 in the branch line 75 as well as said valve's pump-pressure-controlled closing.

In conformity with practical need, the central valve 70 arranged in the branch line 75 can be mounted in the pump 12 or in the valve block, and the master brake cylinder 1 can be simplified in construction to major extent due to the central valve 70 being removed from inside the master brake cylinder 1. Furthermore, the need for the breathering bores and reservoir connections is obviated, whereby a shorter overall length of the brake unit can be realised. Besides, the supply reservoir 4 can be mounted either on the pump 12 or on the valve block.

Figure 7:
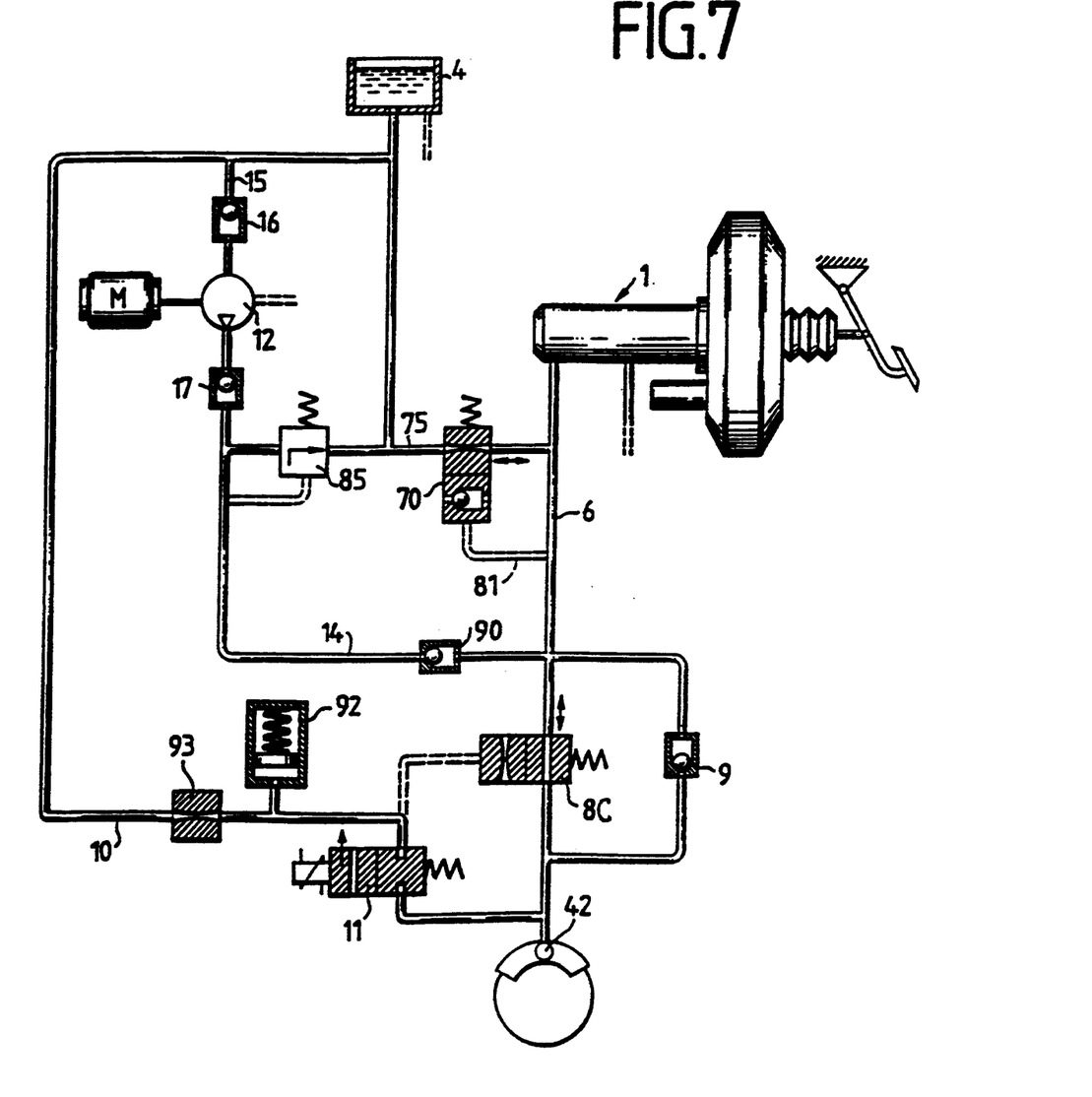
FIG. 7 is a schematic illustration of still another embodiment of the invention in a single circuit of an automotive brake system.

FIG. 7 shows an alternative embodiment of the ABS/TSC hydraulic circuitry according to which the pressure-increase, pressure-decrease and pressure-retaining phases can be realised, while a simple throttle valve 8 designed as two-way/two-position directional control valve is maintained, by means of switching, storing and throttling means inserted into the return line 10, without allowing depression of the pedal through its full travel to occur on opening of the electromagnetically operated outlet valve 11 at the commencement of the anti-lock control action when the throttle valve 8C is in its unrestricted position. Analogously to the hydraulic actuation of the throttle valve 8C through the open outlet valve 11, as described in FIG. 6, the outlet valve 11 is assigned with a low-pressure accumulator 92 having a restrictor 93 inserted thereafter in the return line 10, as a result whereof in the event that pressure reduction in the wheel brake 42 is to be performed relatively quickly, the excess fluid volume will be received by the low-pressure accumulator 92 as well as the switch position of the throttle valve 8C is stabilized. The initial pressure of the low-pressure accumulator 92 is preferably in the range of 1 to 6 bar.

Figure 8:
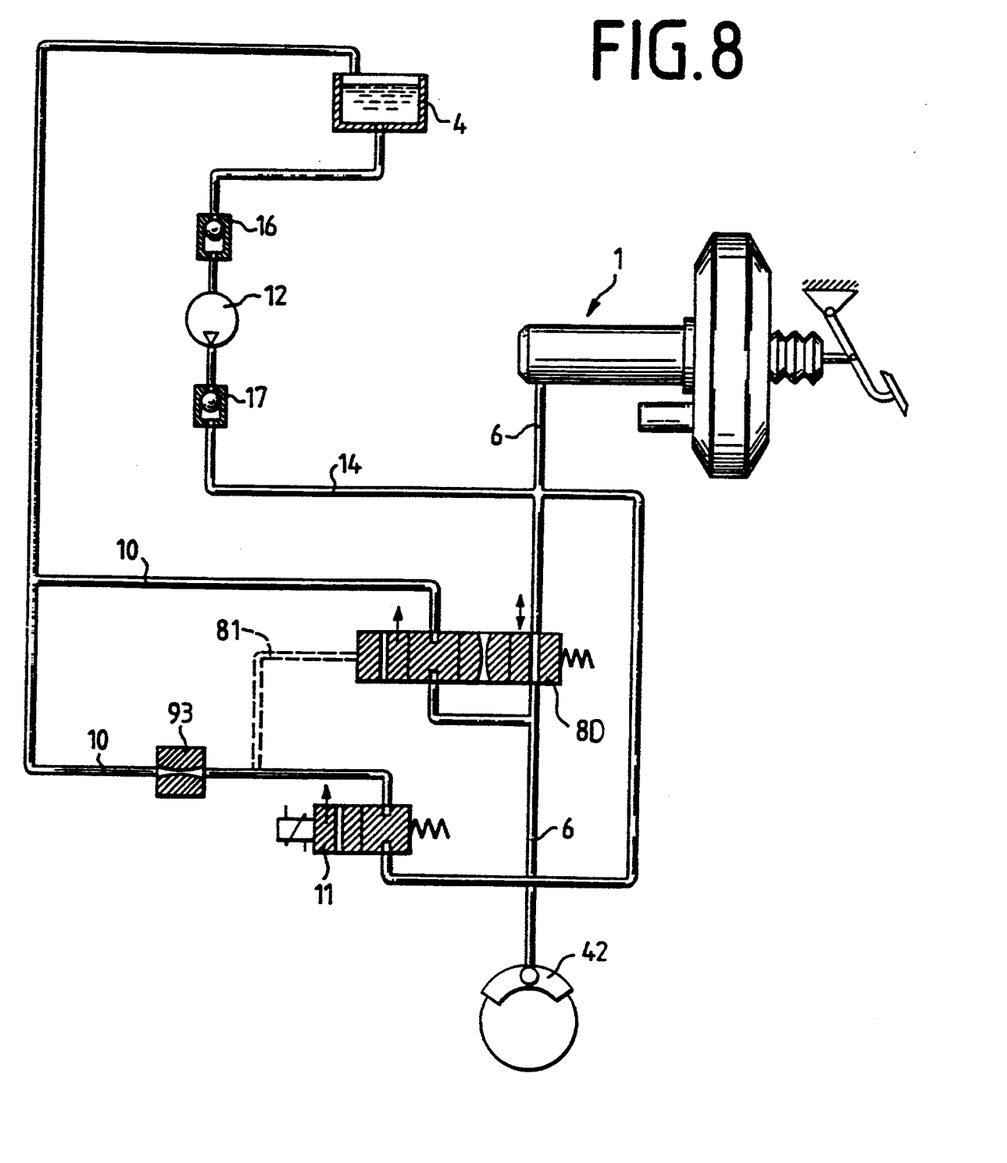
FIG. 8 is a schematic illustration of still another embodiment of the invention in a single circuit of an automotive brake system.

In analog with the ABS/TSC hydraulic circuit configurations according to FIGS. 6 and 7, FIG. 8 shows an alternative design form as well as connection form of the throttle valve 8D designed as four-way/two-position directional control valve, whose hydraulic changeover position, branched off via the control line 81, takes place at the return line 10 between the outlet valve 11 and the restrictor 93. The circuitry shown in FIG. 8 is limited to the ABS-operation alone in order to principally illustrate the functionally relevant features, however, like the shown hydraulic circuitries according to FIGS. 6 and 7 it is able to be extended without limitation to the TSC-operation by inserting a separating valve into the brake line 6 or by separately arranging a central valve in the shunt line between brake line 6 and pump 12.

Whithout slip control and thus in the range of conventional brake operation, the throttle and outlet valves 11 persist in the position as shown in the view of FIG. 8 so that the braking pressure proportional to pedal force is prevailing in the wheel brake 42 via the brake line 6, while the return line 10 from the outlet valve 11 and simultaneously the throttle valve 8D remains closed. Consequently, the control line 81 leading to the throttle valve 8D remains unpressurized at first.

Upon commencement of brake slip control and traction slip control, the throttle valve 8D will be changed over in dependence on the pressure-decrease phase determined by the outlet valve 11 in the latter valve's open position via the control line 81 inserted thereafter, depending on the hydraulic pressure between the outlet valve 11 and the restrictor 93, so that the pressure fluid flowing through the brake line 6 into the wheel brake 42 is restricted by the restricted position of the throttle valve 8D. In contrast to the previously described FIGS. 6 and 7, the restrictor 93 inserted after the outlet valve 11 determines in this arrangement the period of time for change-over of the throttle valve 8D into its unrestricted basic condition, whereby better approximation of the controlled braking pressure variation to the desired control characteristic line of the inventive circuitry according to FIG. 8 is accomplished.

Substantially the same applies for the TSC-operation shown in FIG. 8D what was stated already in respect of the mode of operation of the throttle valve 8 with reference to the embodiments according to FIGS. 6 and 7.

Figure 9:
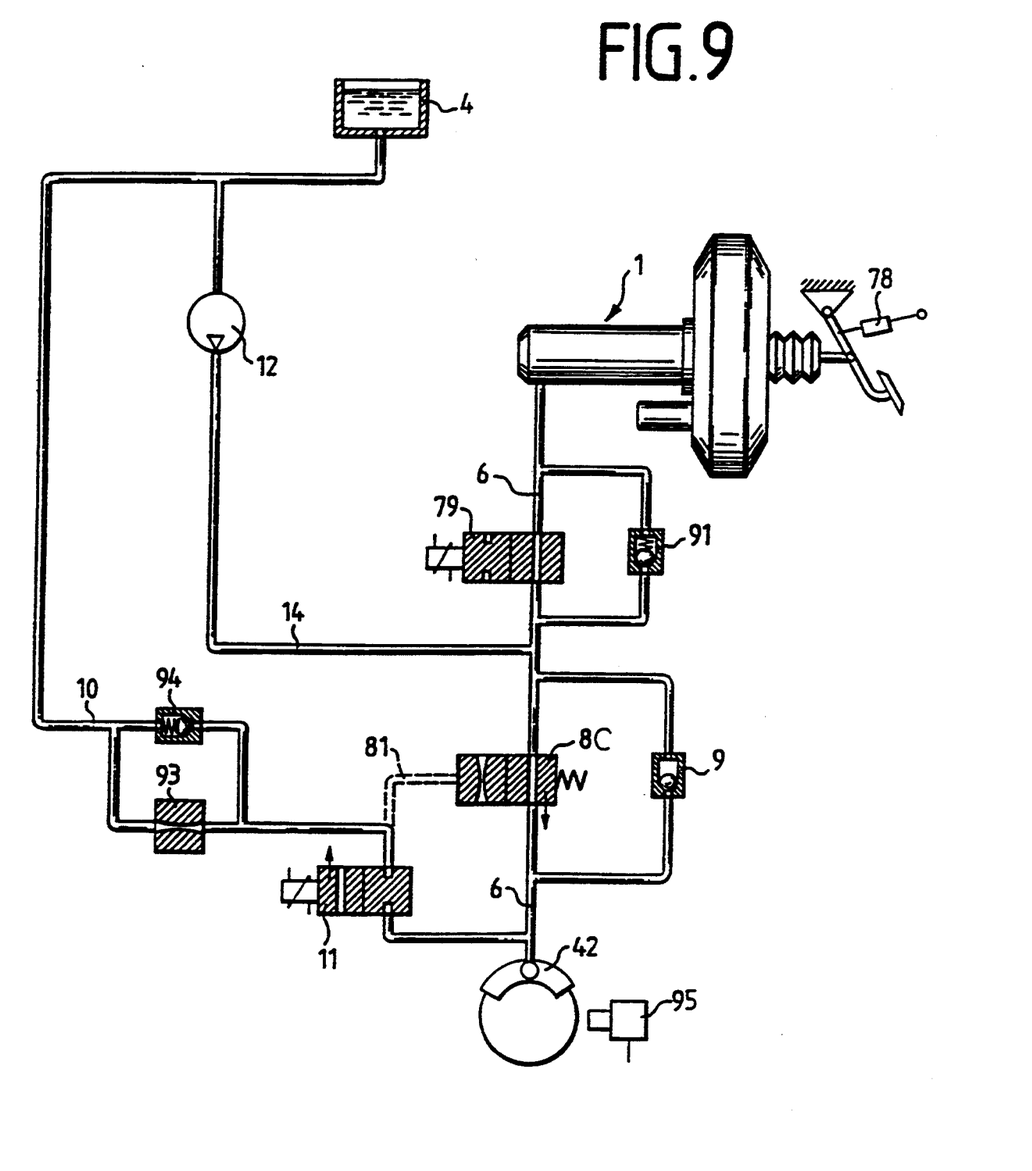
FIG. 9 is a schematic illustration of still another embodiment of the invention in a single circuit of an automotive brake system.

FIG. 9 shows another switching variant for the ABS/TSC operation in conformity with the preceding descriptions of the FIGS., in particular with reference to FIG. 7, however, with the difference that according to FIG. 9 a non-return valve 94 acting to shut off in the direction of the outlet valve 11 is arranged in parallel to the restrictor 93 connected downstream of the outlet valve 11, so that in the event of the restrictor 93 and the non-return valve 94 being structurally united a pressure relief valve is obtained in a simple manner which prevents the disadvantageous influences on the hydraulic fluid flow, in particular the effects of the low-temperature influence on the viscosity of the flow medium.

The hydraulic circuitry according to FIG. 9 shows a master brake cylinder 1 with integrated central valves which are not illustrated therein in more detail, with only one wheel-brake control circuit being shown as an example for the description of function. A brake line 6 connected to the wheel-brake 42 accommodates a separating valve 79 in front of a branch connecting the pump 12 to the pressure line 14, the said separating valve being switched to the opened condition in its basic position and, when excited electromagnetically in the TSC-control cycle, preventing the return flow of pressure fluid into the master brake cylinder 1. In parallel to the separating valve 79, the maximum system pressure of the brake system during the TSC-control operation is limited by virtue of a pressure relief valve opening as non-return valve 91 in the direction of the master brake cylinder 1. In a known fashion described already in detail and in accordance with the previous function descriptions, beyond the conventional braking, data processing exists in the ABS/TSC control electronics depending on the brake slip and traction slip signals ascertained by wheel sensors 95, which electronics among others leads to the already known electromagnetic activation of the separating valve 79 in the TSC-mode and/or to the electromagnetic actuation of the outlet valve 11 both in traction slip control operation and in anti-lock operation. The activation of the pump 12 is controllable by means of a travel sensor 78 installed on the master cylinder side or the pedal side, as shown.

Figure 10:
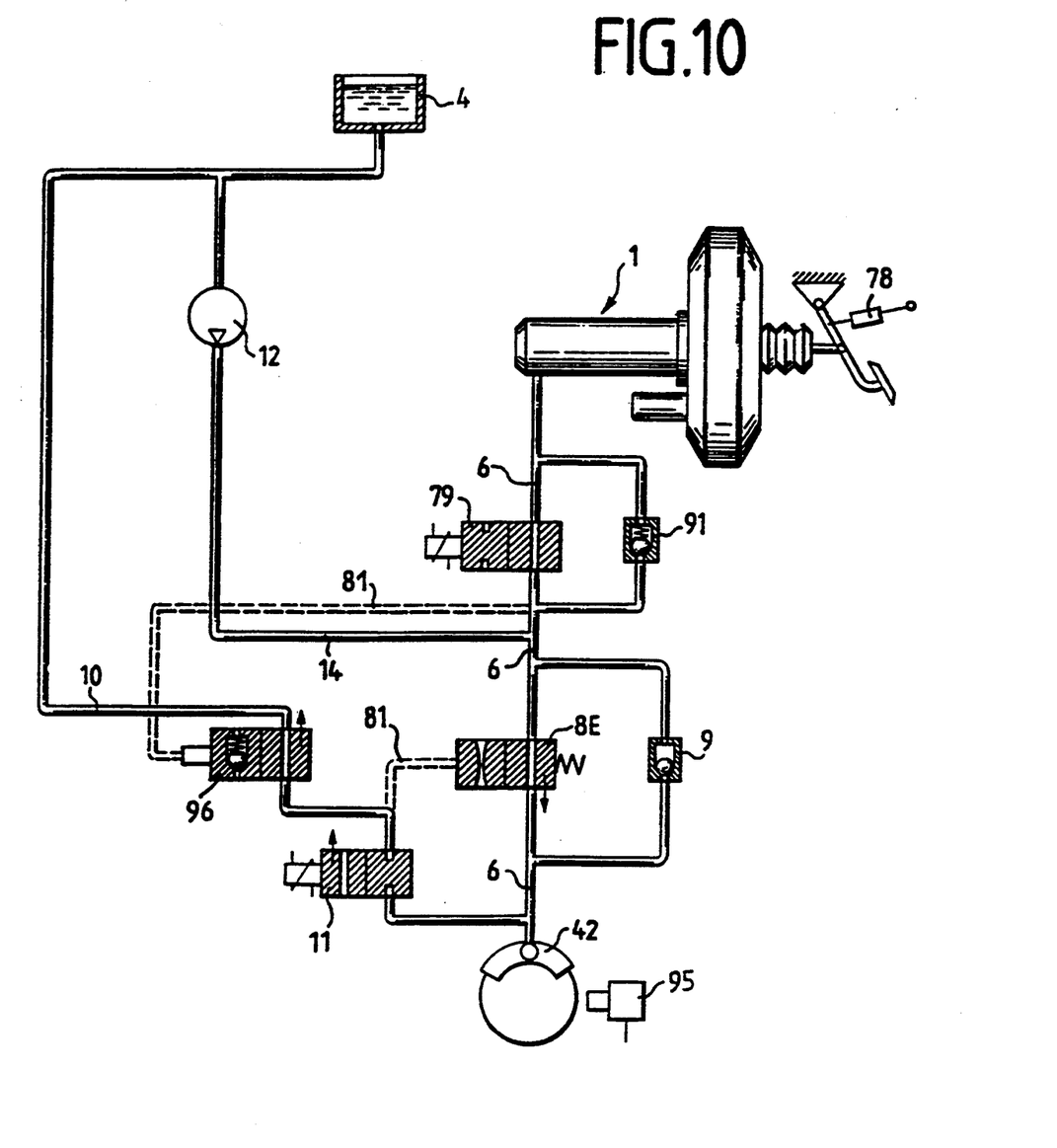
FIG. 10 is a schematic illustration of still another embodiment of the invention in a single circuit of an automotive brake system.

A really favorable rapid control pressure decrease in the control line 81, which lends itself to a surprisingly simple realisation and serves for the hydraulic actuation of the throttle valve 8E can be realised in an inventive fashion according to FIG. 10 by replacing the restrictor connected downstream of the outlet valve 11, see in this respect FIGS. 7, 8, 9, by a two-position valve 96, since the controlled pressure can be decreased at once in an unrestricted manner when the brake pedal is relieved from load. Consequently there are obtained short response times for the hydraulic change-over of the throttle valve 8E. Switching of the two-position valve 96 is effected via a separate second hydraulic control line 81 which is connected downstrem of the separating valve 79 in the main branch leading to the brake line 6. The two-position valve 96 which is serially arranged into the return line 10 and provides unhindered passage in its basic position will be changed over hydraulically in dependence on a pedal-side and pump-side pressure level prevailing in the brake line 6 so that the control pressure necessary for the hydraulic switch-over of the throttle valve 8 can be built up owing to the effectiveness of the non-return valve which forms the backed-up pressure and is integrated in the two-position valve 96. Hence the two-position valve 96 connected into the brake circuit according to FIG. 10 represents an interesting further development of the hydraulic ABS/TSC circuitry according to FIG. 9.

Finally, the importance of eliminating the trouble-afflicted valve components which require complicated and hence costly manufacture shall be referred to in this context, said valve components being avoided by the features relevant for the invention.

We claim:
1. A hydraulic brake system for an automotive vehicle having at least one hydraulically operated wheel brake, said system including:
   a brake pedal;
   a brake pedal operated master cylinder;
   brake pressure line means hydraulically connecting said master cylinder and said wheel brake;
   pump means for supplying pressurized hydraulic fluid to said wheel brake during a controlled brake operation, said pump means including an inlet and an outlet;
   an unpressurized fluid reservoir;
   a return line hydraulically connecting said wheel brake and said unpressurized fluid reservoir;
   an electrically operated outlet valve in said return line having closed and opened conditions to control communication of said fluid reservoir and said wheel brake;
   throttle valve means in said brake pressure line interposed between both of said master cylinder and pump means and said wheel brake, said throttle valve means having a valve member shiftable to create two conditions of said throttle valve means, a first condition providing for free communication to said wheel brake and a second condition providing a restricted communication of said pump means and master cylinder to said wheel brake; and
   means for shifting said throttle valve means to said second restricted condition comprising means causing a fluid pressure condition in said return line immediately upon opening of said outlet valve, said fluid pressure being applied so as to shift said valve member to create said second condition of said throttle valve means, said return line including an operator branch applying pressure therein to said valve member, said operator branch pressurized only upon opening of said outlet valve, whereby said throttle valve means causes restricted communication of said pump means and master cylinder immediately upon opening of said outlet valve.

2. The brake system according to claim 1 wherein said throttle valve means also includes means opening communication between said outlet valve and said fluid reservoir upon said throttle valve assuming said second condition.

3. The brake system according to claim 1 further including a restriction in said return line between said outlet valve and said fluid reservoir.

4. The brake system according to claim 3 also including an accumulator in said return line between said outlet valve and said fluid reservoir.

5. The brake system according to claim 1, wherein said return line also has a branch return line extending from said wheel brake to said fluid reservoir via said throttle valve means, said throttle valve means including means opening communication in said branch return line upon assuming said second condition.

6. A hydraulic brake system for an automotive vehicle having at least one wheel brake, said system including:
   a brake pedal;
   a pedal operated master cylinder
   a brake pressure line means hydraulically connecting said master cylinder and said wheel brake;
   pump means supplying pressurized hydraulic fluid to said wheel brake during controlled brake operation, said pump means including an inlet and an outlet, said outlet connected to said brake line to supply pressurized fluid thereto;

an unpressurized fluid reservoir;

a return line hydraulically connecting said wheel brake and said fluid reservoir;

an electrically operated outlet valve in said return line having closed and opened conditions to control communication of said fluid reservoir and said wheel brake;

throttle valve means in said brake pressure line interposed between both of said master cylinder and pump means outlet connection and said wheel brake, said throttle valve means having a valve member shiftable to create two conditions of said throttle valve means, a first condition providing for free communication to said wheel brake and a second condition providing restricted communication of said pump means and master cylinder to said wheel brake; and means for shifting said throttle valve to said restricted condition comprising means connecting said pump means outlet to said throttle valve means to cause said shifting of said valve member to create said second condition only upon development of fluid pressure by said pump means, and wherein said pump means includes a pump drive, and also including means causing said pump drive to be activated upon opening of said outlet valve.

7. An anti-lock hydraulic brake system for an automotive vehicle having a wheel to be braked, comprising: a master brake cylinder, a pressure-fluid collecting means, at least one hydraulically operated wheel brake, hydraulic circuit means placing said wheel brake in communication with said master brake cylinder, and including a brake line, said hydraulic circuit means also controllably placing said wheel brake in communication with said pressure-fluid collecting means by means including a return line and an electromagnetically actuated outlet valve which is in said return line and which closes said return line in an inactive condition thereof and opens the return line in a switch condition to develop pressure therein by discharge of hydraulic fluid from said wheel brake, a throttle valve means in said brake line and having two switched conditions, a first switched condition establishing an unrestricted fluid connection, between said wheel brake and said master brake cylinder, a second switched condition providing a restricted connection therebetween, pump means including a pump and a pump drive, said pump means having an inlet sucking pressure fluid out of said pressure-fluid collecting means and having an outlet delivering pressure fluid, a pressure line directing pressure fluid from said pump means into said brake line at a location between said master cylinder and throttle valve means, a sensor for ascertaining the angular velocity of said wheel to be braked and generating a signal corresponding thereto, and an electronic analyzing means analyzing said sensor signal and generating switch signals for said pump drive and said outlet valve, wherein said throttle valve means includes a valve member shiftable to cause changing of said throttle valve means between said first and second switched condition and means responsive to development of pressure in said return line by opening of said outlet valve, said means including a control line connected at a point between said outlet valve and said pressure fluid collecting means, said control line connected to cause a change in said switched condition of said throttle valve means to said second switched condition.

8. A brake system as claimed in claim 7, further including switching member comprising an actuating rod drivingly engaging said valve member, said actuating pod having a first separating piston attached thereto, a housing chamber having a cavity receiving said first separating piston, said separating piston subdividing said cavity into two chambers, a switching chamber and a resetting chamber, and means for creating a pressure differential across said separating piston by said development of said pressure in said return line so as to cause said actuating rod to move said throttle valve means valve member to assume said first switched condition.

9. A brake system as claimed in claim 8, wherein said resetting chamber communicates with said return line in an unrestricted fashion, while said switching chamber is connected thereto via a restricted passage whereby a momentary pressure difference is developed across said first separating piston when said outlet valve is opened.

10. A brake system as claimed in claim 9, further including means causing pressure developed at said outlet of said pump means to act on said switching member to cause switching of said throttle valve means from said first to said second switched condition.

11. A brake system as claimed in claim 10, further including a second separating piston fixed on said actuating rod, wherein said housing has a second switching chamber formed therein defined in part by said second separating piston, said second switching chamber connected to said pump outlet, means causing said throttle valve means valve member to be switched to said second switched condition when said second switching chamber is pressurized by said pump outlet pressure.

12. A brake system as claimed in claim 7 further including a non-return valve connected in parallel to said throttle valve.

13. A brake system as claimed in claim 12, and wherein said pressure-fluid collecting means comprises a supply reservoir which is vented to the atmosphere, said master cylinder having a working chamber and said supply reservoir in communication with said working chamber of said master cylinder when said master cylinder is not pressurized.

14. A brake system as claimed in claim 7, wherein said brake system is of dual-circuit design, each brake circuit being assigned with a diagonally opposite vehicle wheels, said pump means including a pair of pumps, and each brake circuit supplied by a respective pump.

15. A brake system as claimed in claim 14, wherein both of said pair of pumps are driven jointly by said pump drive.

16. A brake system as claimed in claim 7, wherein said pump means includes a piston pump having a pump piston, an eccentric driving means constantly maintaining said pump piston against said eccentric.

17. A brake system as claimed in claim 7, wherein said throttle valve means valve member comprises a stepped piston, a housing having a stepped bore with a narrow step, said stepped piston guided in said stepped bore, said stepped piston including a medium area portion which is insertable into said narrow step of said stepped bore, a gap between said stepped-piston medium area portion and said narrow step housing bore, said gap causing throttling of the pressure-fluid flow therepast.

18. A brake system as claimed in claim 7, further including a shut off valve in said brake line adapted to shut off said brake line between a point where said pressure line connects to said brake line and said master brake cylinder.

19. A brake system as claimed in claim 18, wherein said vehicle has driven brake wheels and undriven brake wheels, wherein brakes of driven and non-driven wheels are united in one brake circuit, the brake line to the non-driven wheel branches off between said shut off valve and said master brake cylinder.

20. A traction-slip and brake-slip controlled hydraulic brake system, for an automotive vehicle having wheels to be braked, comprising a master brake cylinder, a supply reservoir, at least one wheel brake which is in communication with said master brake cylinder via a main pressure line and with said supply reservoir via a return line, a throttle valve to the wheel brake, said throttle valve having open and restricted flow conditions, an electromagnetically operated outlet valve having open and closed conditions which is inserted into said outlet valve in said return line to close said return line in said closed condition and open said return line in said open condition, a pump having an inlet sucking pressure fluid out of said supply reservoir and having an outlet delivering pressure fluid to said pressure line into said master brake cylinder, a pump drive, a sensor for ascertaining the angular velocity of each of said wheels and generating a corresponding sensor signal, electronic analyzing means analyzing said sensor signal and generating switch signals for said pump drive and said outlet valve, means operative when said outlet valve is open causing fluid pressure at said wheel brake to act upon said throttle valve so that said wheel braking pressure causes a change of condition of said throttle valve, a restrictor connected in series with said outlet valve in said return line, said restrictor determining a period of delay for changing the throttle valve over into said open condition upon closing of said outlet valve.

21. A brake system as claimed in claim 20, wherein a non-return valve opening in the direction of the return line is connected downstream of said outlet valve.

22. A brake system as claimed in claim 21, wherein said non-return valve in conjunction with said restrictor are arranged in parallel to each other, and form a structurally united pressure relief valve.

23. A brake system as claimed in claim 21, wherein said throttle valve is arranged between said wheel brake and said master brake cylinder and keeps said brake line open when the said outlet valve is closed, and shuts off said return line connected to said outlet valve.

24. A brake system as claimed in claim 23, wherein said throttle valve includes means which in the restricted condition throttles the flow in said brake line and allows unrestricted flow in said return line from said outlet valve to said supply reservoir.

25. A brake system as claimed in claim 24, wherein said throttle valve is a four-way/two-position directional control valve, including ports connecting said return line to said supply reservoir via a return line branch bypassing said restrictor when said outlet valve is closed.

26. A brake system as claimed in claim 20, further including a restrictor in said return control line for actuation of said throttle valve, said control line branched off from said return line between said restrictor and said outlet valve.

27. A brake system as claimed in claim 20, wherein connected downstream of said outlet valve is a two-position valve acted upon by the pressure of said master brake cylinder and by the pump and comprising a return element.

28. An anti-lock hydraulic brake system for a wheel of an automotive vehicle comprising: a brake pedal;
  a master brake cylinder operated by said brake pedal;
  pressure fluid collecting means;
  at least one hydraulically operated wheel brake for braking said vehicle wheel, said wheel brake communicating with the master brake cylinder through a brake line and with the pressure fluid collecting means through a return line;
  an electromagnetically actuated outlet valve operative to close the return line in an inactive position and open the return line in a switched position;
  a throttle disposed between said wheel brake and master brake cylinder and operative to effect substantially unrestricted flow in the brake line in a first position and restricted flow in a second position;
  a pump having an inlet and outlet, said pump operable to draw pressure fluid from said fluid collecting means and discharge it into said wheel brake through said outlet;
  logic means operative to detect the angular velocity of said braked wheel and generate outlet valve control and pump actuation signals as a function thereof and,
  wherein said throttle valve is interconnected to said outlet of said pump by a control line whereby pump discharge pressure effects switching of said throttle valve from said first position to said second position;
  a bypass line extending around said throttle valve means having a one way valve therein opening in the direction towards said master brake cylinder allowing direct return flow from said wheel brake to said master cylinder upon release of said brake pedal.

* * * * *